Feb. 20, 1940. L. F. CARTER 2,190,698
ARTIFICIAL HORIZON
Filed July 1, 1938 2 Sheets-Sheet 1

INVENTOR
Leslie F. Carter
BY
HIS ATTORNEY

Feb. 20, 1940.　　　L. F. CARTER　　　2,190,698
ARTIFICIAL HORIZON
Filed July 1, 1938　　　2 Sheets-Sheet 2
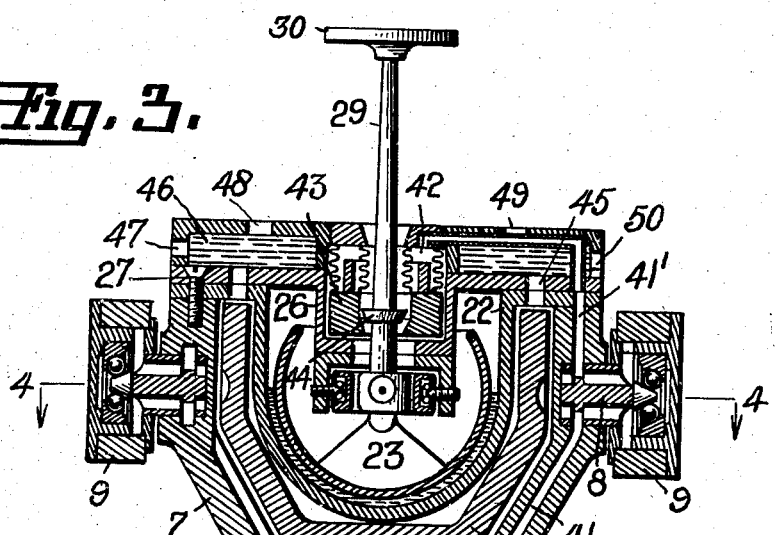
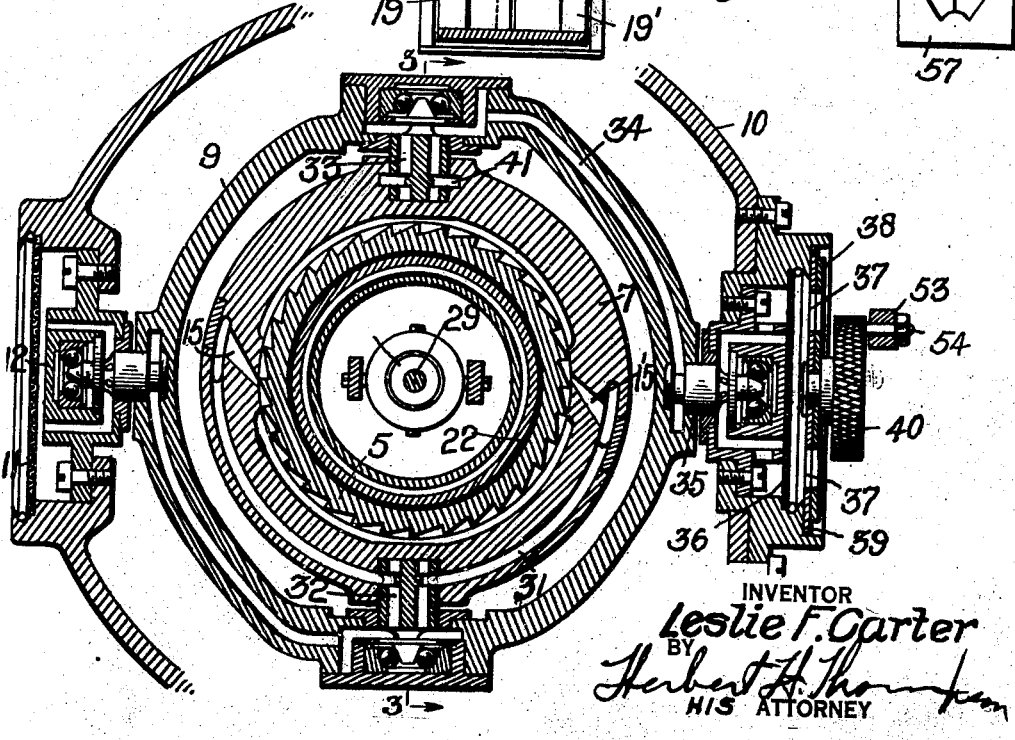
INVENTOR
Leslie F. Carter
BY
Herbert H. Thompson
HIS ATTORNEY Patented Feb. 20, 1940

2,190,698

UNITED STATES PATENT OFFICE 2,190,698

ARTIFICIAL HORIZON

Leslie F. Carter, Leonia, N. J., assignor to Sperry Gyroscope Company, Inc., Brooklyn, N. Y., a corporation of New York Application July 1, 1938, Serial No. 216,957

8 Claims. (Cl. 74—5)

This invention relates to the art of artificial horizons, wherein the purpose is to maintain a reference plane as nearly horizontal as possible, regardless of disturbing forces which may act upon the instrument. More particularly, the invention relates to improvements in artificial horizons or gyro-verticals used on aircraft.

The common practice is to use gyroscopes with a vertical spin axis and supported in neutral equilibrium to maintain a substantially vertical reference line. Artificial horizons of the gyroscopic type, even if they are supplied with automatic self-erecting means to maintain the gyro spin axis substantially vertical, are subject to a number of errors which, for ordinary flying purposes, are small enough to be neglected. The errors, however, become important if the artificial horizon is furnishing the horizontal reference plane for navigational observations such as, for instance, a sextant. In such instruments an error even of only several minutes of arc will result in an appreciable error in the position calculated when using the gyroscopically maintained horizontal reference plane, so that extreme accuracy is required.

It is the purpose of this invention to overcome the inaccuracies and errors of the present gyroscopic artificial horizon. It is commonly known that a vertical gyroscope is subject to a so-called "latitude error" caused by the effect of the earth's rotation upon the gyro. This error is proportional to the cosine of the latitude and, with present day high speed airplanes, such error would change quite appreciably in a relatively short time, so that correction is difficult.

Another error is the "speed error" which is caused by the effect of the speed of the craft, as it adds or subtracts from the circumferential speed of the earth. As modern airplanes may fly at speeds upward of 300 miles per hour, it is obvious that the speed error will also be large.

This invention combines a vertical gyro with a damped long period pendulum, wherein I employ the pendulum instead of the gyroscope to furnish the horizontal reference plane, while the gyro itself is used only for the purpose of supporting the pendulum on a platform which is kept substantially horizontal, so that the rolling and pitching angular movements of the craft do not reach the pendulum. This combination will avoid the above mentioned latitude and speed errors because a pendulum is not subject to these errors, and slow changes of the position of the vertical axis of the horizon gyro will not be transmitted to the pendulum.

In order to prevent the pendulum from oscillating at its own natural period, I prefer to apply damping means between the pendulum and the gyro casing, so that the damped period of the pendulum may be made of any desired value by choosing the location of the center of gravity as well as the viscosity of the damping medium.

A further object of a modified form of my invention is to prevent the artificial horizon from assuming errors due to lateral acceleration forces caused by a change of course of the craft. Normally, the pendulous erecting means of the gyro tend to gradually precess the gyro until it lines up with the apparent vertical, and so the pendulum itself is also directly deflected. I propose to cut off the erecting devices and at the same time to arrest the pendulum in such a way that it becomes rigidly connected to the gyro case during the presence of acceleration forces, due to turning and the like. Simultaneously, a weight is shifted in such a way as to compensate for the change in the position of the center of gravity of the whole assembly, which otherwise would become pendulous as soon as the pendulum is rigidly connected to the gyro case. As the initial balance of the gyroscope itself is made for neutral equilibrium, the above described procedure is necessary in order to prevent spiral oscillations of the gyro under the influence of centrifugal forces.

Referring to the drawings,

Fig. 3 shows a vertical section through a modified form of my invention, along line 3—3 of Fig. 4.

Fig. 4 is a horizontal section through the same instrument along line 4—4 of Fig. 3.

Fig. 5 shows a simple means for automatically shutting off the air supply for the erector and arresting the pendulum during turn of the craft.

Figure 1:
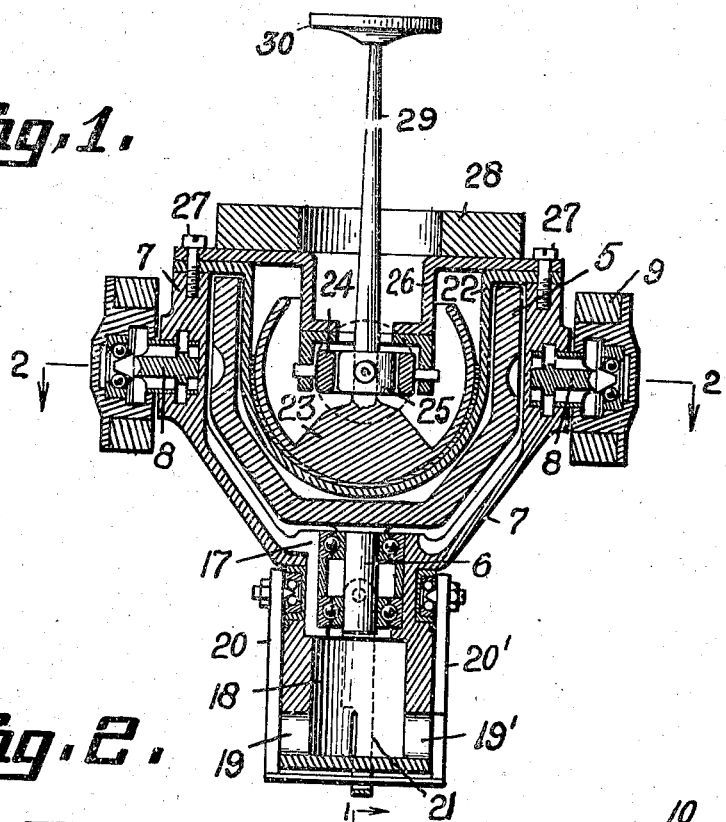
Fig. 1 is a vertical section of a preferred form of my invention, taken along line 1—1 of Fig. 2.
Figure 2:
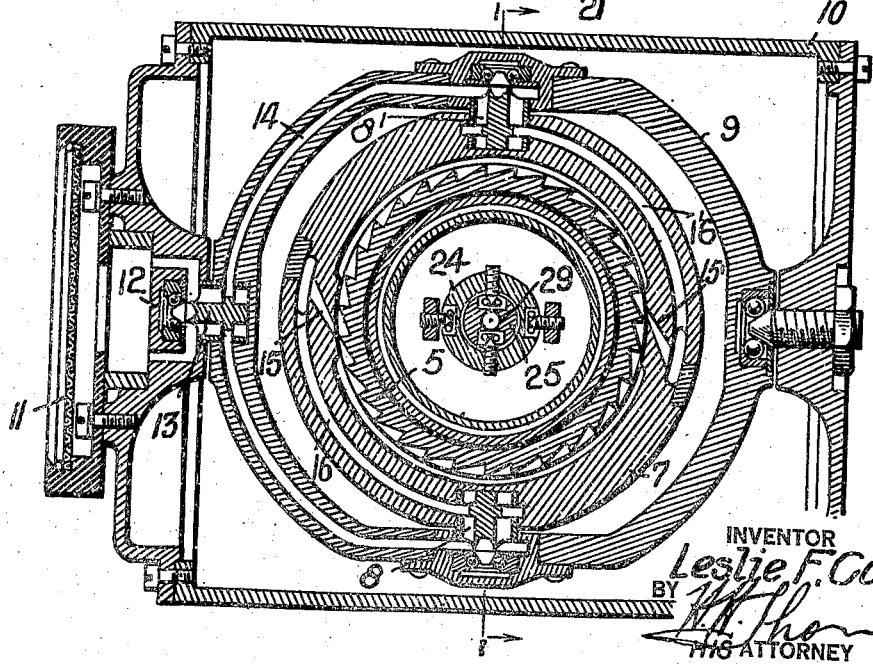
Fig. 2 is a horizontal section through the same instrument taken along line 2—2 of Fig. 1.

In Figs. 1 and 2, the gyro rotor is shown as a cup-shaped member 5 having its shaft 6 mounted in ball bearings in the casing 7. The casing is supported by perforated pivots 8 and 8' in a gimbal ring 9 which, in turn, is pivoted in stationary bearings mounted in the outer casing 10. The casing is preferably mounted in neutral equilibrium and is erected by gravitationally responsive means such as shown in the prior patent to Carlson #1,982,636, dated December 4, 1934.

The gyro rotor 5 is shown as spun by means of air jets. Following the usual practice, the casing 10 is evacuated through a pipe (not shown) so that the pressure inside of the housing 10 is lower than that of the surrounding atmosphere. Air will enter through the filter or screen 11, from there through passages around the bearing 12, through the perforated pivot 13, and into an inner air chamber 14 in the gimbal ring 9, by which it is conducted to the perforated pivots 8 and 8'. Two jets 15 and 15' are supplied with air through passages 16 and 16' located within the wall of the casing 7. Due to the evacuation of the housing 10, air will stream out of the jets 15 and 15' and drive the gyro rotor at high speed.

Referring now to Fig. 1, the air, after it has driven the gyroscope, will escape through the passage 17 into the chamber 18, from where it emerges through ports 19 and 19'. The opening of these ports is controlled in known manner by the auxiliary small erecting pendulums 20 and 20' for one axis and 21, 21' for the other axis. The action of these pendulums and jets is fully described in the above mentioned patent to B. G. Carlson.

The casing 7 carries at its upper rim a cup 22 which, in its lower part, is spherically shaped and which occupies most of the free space inside of the cup-shaped gyro rotor 5. A pendulum 23 having a spherically shaped body is mounted on a small gimbal system 24, 25 on a member 26 supported on top of the cup-shaped member 22 and held to the gyro casing 7 by screws 27. A balancing weight 28 may be mounted on top of the member 26 to obtain neutral equilibrium of the whole assembly. The narrow space between the spherical part of the cup 22 and the spherical body of the pendulum 23 is preferably partly filled by a viscous liquid, such as oil or the like, which serves as a damping medium.

According to my invention, I mount the reference member 30 on the pendulum, instead of on the gyroscope, as has heretofore been the practice. A stem 29 is connected to the pendulum 23 and carries at its upper end the reference member, which in this case is a flat, polished plate 30 which serves as a mirror and which may have engraved upon it reticle lines or other marks of reference.

In operation, this combined gyro and pendulum will maintain the plate 30 in a horizontal plane with great accuracy, as the normal position of the pendulum will be the true vertical as long as no lateral acceleration forces are present, and as roll and pitch motions of the vehicle are eliminated by the stabilizing action of the gyroscope. The cup member 22, which serves as the point from which the pendulum 23 is damped, is kept in a substantially horizontal position by the action of the gyroscope, and only subject to the above explained errors common to all self-erecting vertical gyros. The pendulum 23, however, is free from the gyro errors, the changes of which only occur very slowly and therefore are not transmitted to the pendulum itself.

In case of turns of the vehicle on which the instrument is carried, it is obvious that both the pendulum as well as the gyroscope will ultimately line themselves up with the apparent vertical, and therefore indicate an erroneous reference plane. To overcome this, I have shown a modified artificial horizon in Figs. 3 and 4, which is automatically freed from the effects of centrifugal acceleration forces during turns by interconnecting the shut-off valve with a turn indicator gyro, as will be described hereinafter. The reference numbers in Figs. 3 and 4 correspond to those in Figs. 1 and 2.

As will be seen in Fig. 4, the casing 7 is differently constructed than that shown in Fig. 2. The two jets 15 and 15' are supplied with air through a single passage 31 which is connected to the perforated pivot 32. This pivot obtains its air in the same manner as described before. The opposite pivot 33, however, is supplied with air through a separate channel 34 which, by means of the perforated pivot 35, is connected through a filter 36 to a separate air intake formed by the ports 37 of a shutter arrangement 38, 39. The plate 39 is mounted fixedly in the casing 10 and has a plurality of holes which, when the shutter is open, are in exact alignment with an equal number of holes in the rotatable plate 38, which can be turned by the knob 40. If the knob 40 is turned through an angular amount corresponding to the diameter of the ports 37, no air will be allowed to enter.

The air from channel 34 and through pivot 33 enters into a passage 41, from where it is conducted into the chamber 18 in order to operate the before described erection device. The passage 41, through the channel 41', is also connected to the inside of an annular bellows 42 which, due to the difference of pressure between the outer atmosphere and the air inside of the bellows, is normally in an expanded condition. At the lower end of the bellows 42 there is attached a member 43 made out of a suitable resilient material which serves at least one, and preferably two purposes, namely, (1) temporarily to lock the gyro to the housing and (2) to compensate for the change of center of gravity of the whole assembly after the pendulum has been so locked. For this purpose the stem 29 of the pendulum 23 has been provided with a circular conical collar 4 which fits a similar conical recess in the weight 43. If the air supply to the passages 41 and 41' is interrupted by the shutter 38, the resilient bellows 42 will contract and lift the weight 43 up until it seats itself upon the conical collar 44 of the stem 29, thereby arresting the pendulum. At the same time a predetermined amount of weight has been lifted a predetermined distance, which is so calculated that the product of weight and distance of the center of gravity of the weight from the gimbal center is equal to the product of the unbalanced weight of the pendulum 23 and the distance of its center of gravity from the same gimbal center. In this way the equilibrium of the whole assembly is kept constant, so that acceleration forces cannot act upon the gyro itself.

At the same time the shutter 38 also prevents further air jet effect from the ports 19 and 19', so that there is no erecting force present to precess the gyro into the apparent vertical.

The air which has been used to spin the gyro rotor 5 escapes through passages 45 into a diffusion chamber 46 filled with porous material which will let the air pass through, but which will prevent the forming of any jet effects at the ports 47, 48, 49 or 50.

Fig. 5 shows schematically how the automatic operation of the shutter 38 is accomplished by means of a turn indicator gyro. 57 is the housing of a turn indicator gyro and shaft 52 is linked to the precession axis of the gyro to be rocked thereby. In case of turns to the left or right, the lever 52' will assume one of the positions shown in dotted lines, as the case may be, and by means of a connecting rod 53 turn the knob 40, as the free end of the rod 53 is connected to the pin 54 on the knob 40. The length of the lever arm 52' is so dimensioned that it will provide sufficient angular motion to shut the ports 37 completely for a turn of appreciable magnitude.

Only one form of an automatic connection between the turn indicator and shut-off ports is shown in Fig. 5. It is understood, however, that other means to accomplish the same purpose could be employed. It is also obvious that knob 40 can be manually operated in case no turn indicator is available.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an artificial horizon, a universally suspended, self-erecting gyroscope mounted in substantially neutral equilibrium having a casing, a universally suspended pendulum mounted on said casing, a reference member carried by said pendulum, damping means between said pendulum and said casing, and means for locking said pendulum to the gyroscope during turns.

2. In an artificial horizon, a gyroscope suspended for oscillation about two axes perpendicular to each other and mounted in substantial equilibrium, said gyroscope having a vertical spin axis and a casing having a recess forming part of a hollow sphere, means for automatically erecting said spin axis, a pendulum universally suspended for oscillation about said two axes on said casing, said pendulum having a body forming part of a sphere concentric with said first named sphere, and a viscous substance filling part of the gap between said first and said last named sphere.

3. In an artificial horizon for moving vehicles, a universally suspended gyroscope mounted in substantially neutral equilibrium, having a rotor, a casing for said rotor, and means for erecting said rotor and casing, a universally suspended damped pendulum on said casing, means to render inactive said erecting means during a turn of said vehicle, and means to simultaneously arrest said pendulum.

4. In an artificial horizon for moving vehicles, a universally suspended gyroscope mounted in substantially neutral equilibrium, having a rotor, a casing for said rotor, and means for erecting said rotor and casing, a universally suspended damped pendulum on said casing, means to render said erecting means inactive during a turn of said vehicle, means to simultaneously arrest said pendulum, and means for compensating for the shift in the center of gravity of the gyroscope due to arresting said pendulum to maintain the gyroscope in neutral equilibrium.

5. In an artificial horizon, a universally suspended pendulum having a body forming part of a sphere, a casing forming part of a hollow sphere, said pendulum being mounted on said casing to maintain said first named sphere concentric to said last named sphere, a viscous damping medium partly filling the space between said two spheres, and gyroscopic means associated with said casing to stabilize said casing.

6. In an artificial horizon for moving vehicles, a universally suspended air spun vertical gyro mounted in substantially neutral equilibrium, a casing enclosing the same and having air jets to spin said gyro, gravity controlled air operated erecting means mounted on said casing, a universally suspended pendulum mounted on said casing, air operated means comprising bellows and a weight adapted to be raised to lock said pendulum to said casing, an air inlet for said spinning jets, a second air inlet common to said erecting means and to said bellows, and means to close said last named inlet during turns.

7. In an artificial horizon, a universally suspended long period pendulum, an enclosure therefor also universally mounted, damping means interposed between said pendulum and said enclosure, an air driven vertical gyroscope also enclosed in said enclosure, gravity controlled, normally active, air operated erecting means for said gyroscope, normally inactive air operated means to lock said pendulum in neutral position to said enclosure, and means to render said erecting means inactive when the pendulum is locked.

8. An artificial horizon as claimed in claim 7, having means for preventing the locking of said pendulum from disturbing the neutral equilibrium of said universally mounted enclosure.

LESLIE F. CARTER.